United States Patent
Damle et al.

(10) Patent No.: US 12,532,041 B2
(45) Date of Patent: Jan. 20, 2026

(54) USER PREMISES FIBER INTERCONNECT AS-A-SERVICE

(71) Applicant: AT&T Intellectual Property I, L.P., Atlanta, GA (US)

(72) Inventors: Rajendra Damle, Plano, TX (US); Lynn Nelson, Matawan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 21 days.

(21) Appl. No.: 18/754,798

(22) Filed: Jun. 26, 2024

(65) Prior Publication Data

US 2026/0006280 A1  Jan. 1, 2026

(51) Int. Cl.
*H04N 21/426* (2011.01)
*H04N 21/236* (2011.01)
*H04N 21/63* (2011.01)

(52) U.S. Cl.
CPC ..... *H04N 21/42607* (2013.01); *H04N 21/236* (2013.01); *H04N 21/632* (2013.01)

(58) Field of Classification Search
CPC ........... H04N 21/236; H04N 21/42607; H04N 21/632
See application file for complete search history.

(56) References Cited

U.S. PATENT DOCUMENTS

| | | | |
|---|---|---|---|
| 6,078,356 A * | 6/2000 | Jensen | H04N 23/20 398/1 |
| 6,305,851 B1 * | 10/2001 | Stummer | H04B 10/071 385/24 |
| 6,934,965 B2 * | 8/2005 | Gordon | H04N 21/23614 348/E7.063 |
| 8,095,954 B2 * | 1/2012 | Walter | H04N 21/482 725/47 |
| 8,488,969 B1 * | 7/2013 | Masarik | H04N 23/51 398/141 |
| 8,532,459 B2 * | 9/2013 | Heath | H04N 5/76 725/38 |
| 9,215,508 B2 * | 12/2015 | Hashiguchi | H04N 21/60 |
| 9,350,953 B2 * | 5/2016 | Hashiguchi | H04N 7/18 |
| 9,900,653 B2 * | 2/2018 | Kitano | H04N 21/44227 |
| 10,491,296 B1 * | 11/2019 | Wellbrock | H04B 10/073 |
| 10,523,890 B2 * | 12/2019 | Gao | H04N 21/41407 |
| 10,567,804 B2 * | 2/2020 | Chen | H04N 21/2401 |
| 11,223,870 B2 * | 1/2022 | Gao | H04N 19/593 |
| 11,381,869 B2 * | 7/2022 | Gao | H04N 21/234309 |
| 11,671,172 B1 * | 6/2023 | Jiang | G01M 11/3145 398/16 |
| 2002/0015212 A1 * | 2/2002 | Fujiwara | G02F 1/0121 359/278 |
| 2002/0144267 A1 * | 10/2002 | Gutta | H04N 21/4532 348/E5.104 |

(Continued)

*Primary Examiner* — Michael B. Pierorazio

(74) *Attorney, Agent, or Firm* — Guntin & Gust, PLC; Dana B. LeMoine

(57) ABSTRACT

Aspects of the subject disclosure may include, for example, a fiber interconnect system that includes gateways and wall boxes. Gateways and wall boxes may include pluggable modules with client side connectors and may include optical connections. The client side connectors may be coupled to client devices via Ethernet connections, HDMI connections, and the like. The gateways and wall boxes may be coupled by optical fibers. Other embodiments are disclosed.

20 Claims, 14 Drawing Sheets

(56) References Cited

U.S. PATENT DOCUMENTS

| | | | | |
|---|---|---|---|---|
| 2003/0009757 A1* | 1/2003 | Kikinis | ............ | H04N 21/25866 725/39 |
| 2003/0051246 A1* | 3/2003 | Wilder | ............... | H04N 7/17318 348/E7.071 |
| 2004/0060059 A1* | 3/2004 | Cohen | .................... | G08C 17/02 725/29 |
| 2005/0108751 A1* | 5/2005 | Dacosta | ............. | H04N 21/4135 348/E5.103 |
| 2006/0123455 A1* | 6/2006 | Pai | ..................... | H04N 21/2668 348/E7.071 |
| 2007/0061840 A1* | 3/2007 | Walter | ............... | H04N 21/6582 725/50 |
| 2007/0061842 A1* | 3/2007 | Walter | .................. | H04N 21/47 725/39 |
| 2007/0136742 A1* | 6/2007 | Sparrell | ................. | H04N 21/84 348/E5.007 |
| 2008/0025693 A1* | 1/2008 | Lee | ........................ | H04N 5/782 386/291 |
| 2008/0028318 A1* | 1/2008 | Shikuma | ............ | H04N 21/4751 715/744 |
| 2008/0063398 A1* | 3/2008 | Cline | ..................... | H04N 21/21 725/76 |
| 2008/0109849 A1* | 5/2008 | Wang | .................. | H04N 21/485 725/46 |
| 2009/0217318 A1* | 8/2009 | VerSteeg | ................ | G06Q 30/02 725/32 |
| 2010/0115557 A1* | 5/2010 | Billmaier | ............. | G06F 16/435 707/E17.014 |
| 2010/0251304 A1* | 9/2010 | Donoghue | ......... | H04N 21/4755 725/46 |
| 2010/0325672 A1* | 12/2010 | Barnett, Jr. | .......... | H04N 21/637 725/81 |
| 2011/0023081 A1* | 1/2011 | Mornhineway | ........ | G08C 23/04 398/115 |
| 2011/0173665 A1* | 7/2011 | Shim | ...................... | H04H 60/06 725/46 |
| 2011/0320482 A1* | 12/2011 | Barbieri | .............. | G06F 16/9535 707/769 |
| 2012/0074863 A1* | 3/2012 | Shimomura | ......... | H05B 45/395 315/246 |
| 2012/0151529 A1* | 6/2012 | Andersson | ......... | H04N 21/4788 725/44 |
| 2012/0159551 A1* | 6/2012 | Walter | .................. | H04N 21/482 725/45 |
| 2013/0326560 A1* | 12/2013 | Wang | .................. | H04N 21/4782 725/56 |
| 2014/0082672 A1* | 3/2014 | Casey | ............... | H04N 21/25891 725/50 |
| 2015/0020088 A1* | 1/2015 | Velasco | ............... | H04L 12/2838 725/116 |
| 2016/0127771 A1* | 5/2016 | Pasqualino | ............ | H04N 19/65 348/474 |
| 2016/0150198 A1* | 5/2016 | Hashiguchi | ............ | H04N 7/22 398/115 |
| 2016/0373810 A1* | 12/2016 | Ansari | ............ | H04N 21/43637 |
| 2017/0155463 A1* | 6/2017 | Lee | ...................... | H04B 10/0795 |
| 2019/0132148 A1* | 5/2019 | Kambhatla | .............. | H04N 21/434 |
| 2020/0280370 A1* | 9/2020 | Frozenfar | ........ | H04B 10/25891 |
| 2021/0021762 A1* | 1/2021 | Hashiguchi | ............ | H04N 23/69 |
| 2021/0099773 A1* | 4/2021 | Bouazizi | .......... | H04N 21/85406 |
| 2021/0392300 A1* | 12/2021 | Tong | ..................... | G02B 6/428 |
| 2021/0392301 A1* | 12/2021 | Tong | ................. | H04N 21/43635 |
| 2022/0109908 A1* | 4/2022 | Chan | ................ | H04N 21/43635 |
| 2022/0116548 A1* | 4/2022 | Fletcher | ............. | H04N 21/854 |
| 2022/0231759 A1* | 7/2022 | Schell | ................... | G02B 6/4206 |
| 2023/0141032 A1* | 5/2023 | Awad | ............. | H04W 56/0015 370/350 |
| 2023/0353249 A1* | 11/2023 | Shitaba | ............ | H04B 10/25751 |
| 2024/0063916 A1* | 2/2024 | Shitaba | ................ | H04B 10/503 |

* cited by examiner

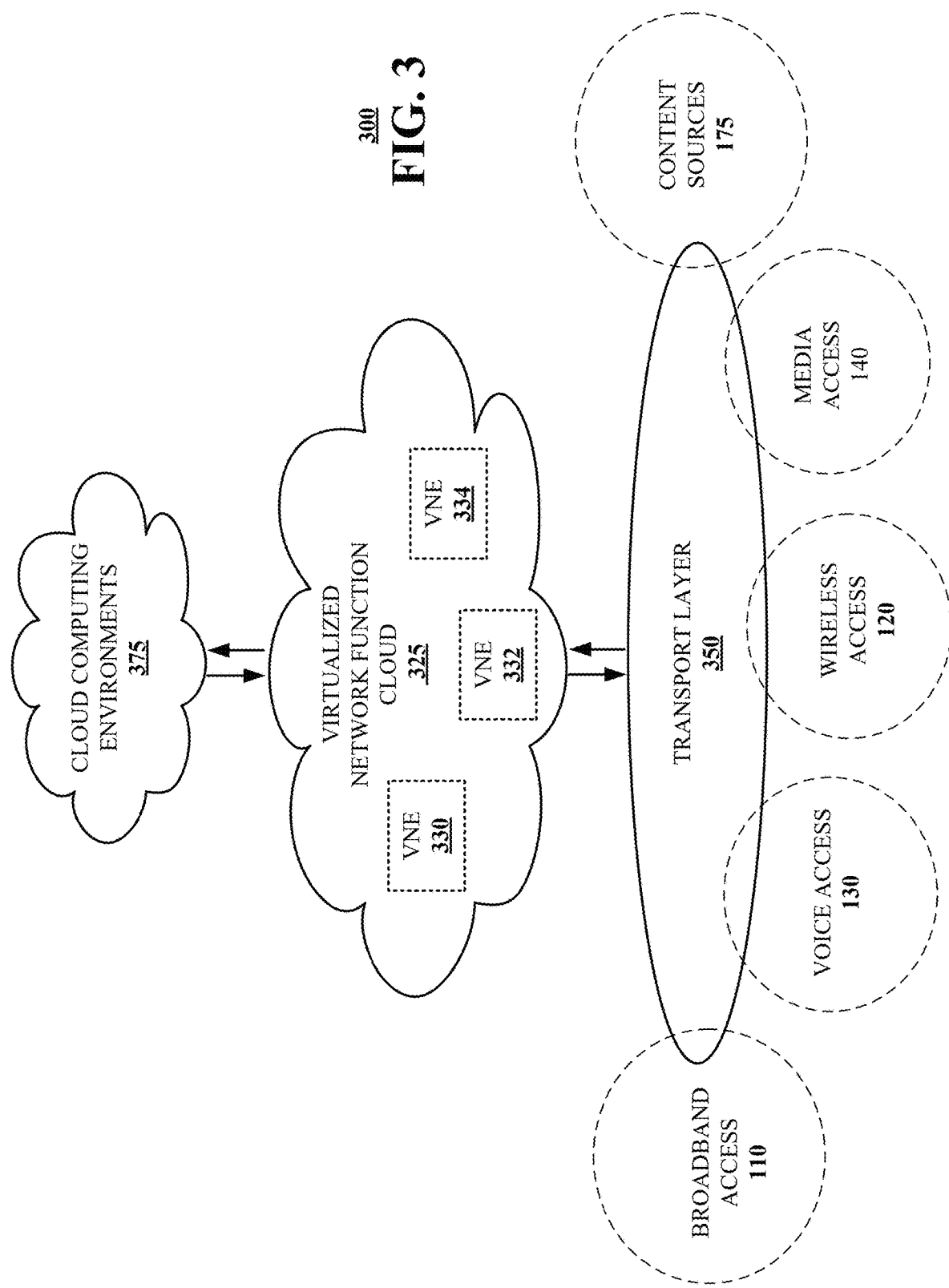

US 12,532,041 B2

USER PREMISES FIBER INTERCONNECT AS-A-SERVICE

FIELD OF THE DISCLOSURE

The subject disclosure relates to fiber interconnect devices.

BACKGROUND

Typical home networks include an internet service provider (ISP) connection and a router. The router connects to multiple devices within the home network using point-to-point wiring. An example of point-to-point wiring includes Ethernet cables.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
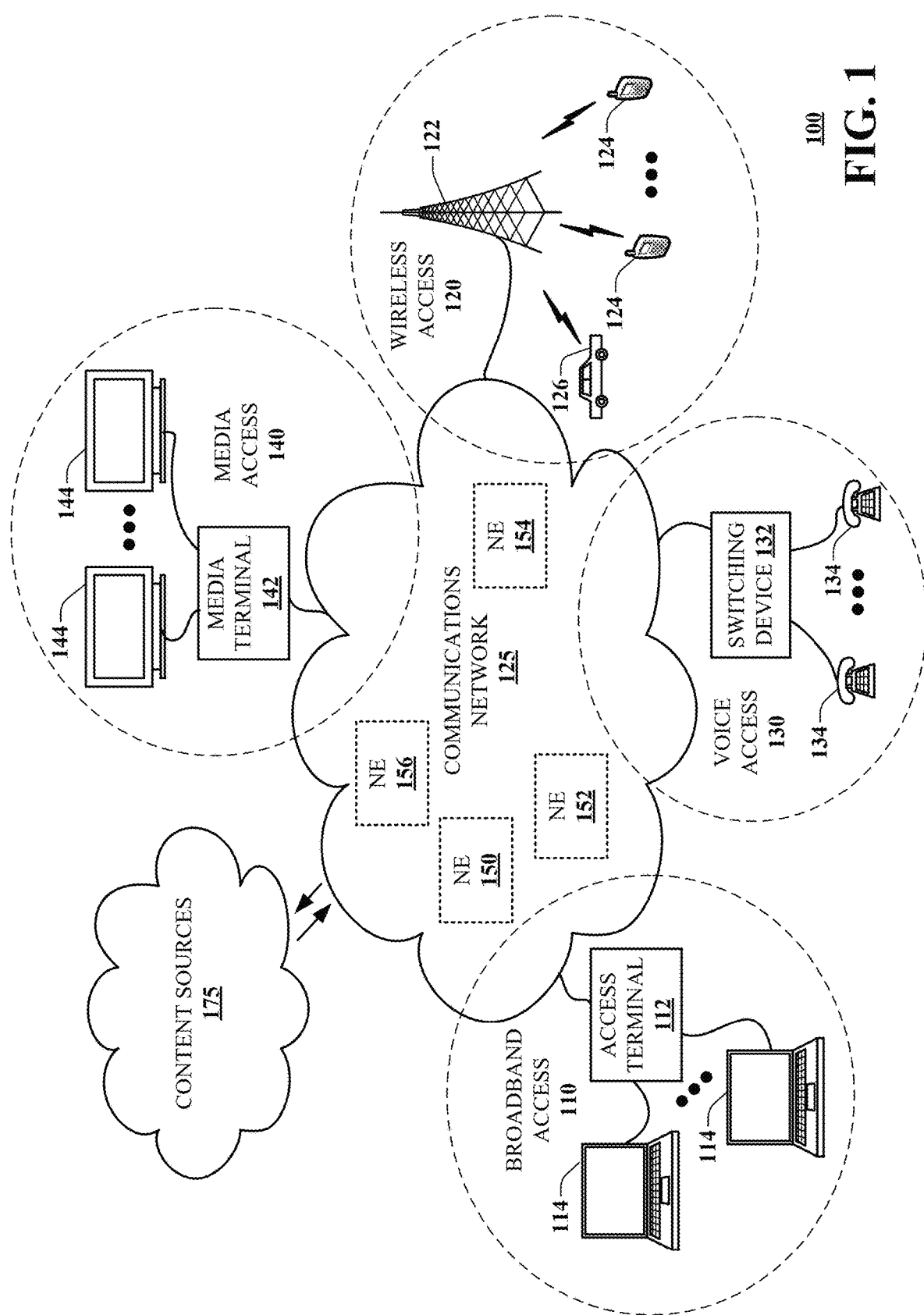
FIG. 1 is a block diagram illustrating an exemplary, non-limiting embodiment of a communications network in accordance with various aspects described herein.

The subject disclosure describes, among other things, illustrative embodiments for fiber networks. Other embodiments are described in the subject disclosure.

One or more aspects of the subject disclosure include a device having a processing system including a processor; and a memory that stores executable instructions that, when executed by the processing system, facilitate performance of operations. The operations may include receiving first data from a wide area network (WAN) port of the device, the first data including a plurality of logical Ethernet bitstreams; instantiating a first virtual machine to receive a first logical Ethernet bitstream of the plurality of logical Ethernet bitstreams, and to produce a first logical video bitstream; and multiplexing a second logical Ethernet bitstream of the plurality of logical Ethernet bitstreams and the first logical video bitstream onto an optical fiber coupled to a multi-protocol fiber interface of the device.

One or more aspects of the subject disclosure include a non-transitory machine-readable medium, having executable instructions that, when executed by a processing system including a processor, facilitate performance of operations. The operations may include instantiating a virtual router to communicate with a wide area network (WAN) port; instantiating a first virtual streaming device coupled to receive a first logical Ethernet bitstream from the virtual router and to create a logical video bitstream; and multiplexing the logical video bitstream and a second logical Ethernet bitstream onto an optical fiber coupled to a multi-protocol fiber interface.

One or more aspects of the subject disclosure include method, comprising instantiating, by a processing system including a processor, a plurality of virtual machines coupled to receive data from a wide area network (WAN) port; creating, by the plurality of virtual machines, a plurality of data streams in different formats from the data received from the WAN port; and wavelength multiplexing, by the processing system, the plurality of data streams in different formats onto an optical fiber.

Additional aspects of the subject disclosure may include wavelength multiplexing the second logical Ethernet bitstream and the first logical video bitstream onto the optical fiber; receiving the first data from an optical fiber WAN port; receiving the first data from a wireless WAN port; instantiating a virtual router to receive the first data, and to separate the first data into the plurality of logical Ethernet bitstreams.

Further additional aspects of the subject disclosure may include the first virtual machine comprising a virtual set top box; or the first virtual machine comprising a logical video streaming service device.

Further additional aspects of the subject disclosure may include addressing the first logical video bitstream to a destination device coupled to the optical fiber; and/or receiving, from the destination device, a virtual infrared controller signal to control the first virtual machine, wherein the virtual infrared controller signal is received as a wavelength multiplexed signal on the optical fiber.

Referring now to FIG. 1, a block diagram is shown illustrating an example, non-limiting embodiment of a system 100 in accordance with various aspects described herein. For example, system 100 can facilitate in whole or in part user premises fiber interconnect. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

In some embodiments, one or more of media terminal 142, access terminal 112, and switching device 132 include, or are embodied by, multi-function fiber gateways and/or multi-protocol fiber interconnect devices as described below with reference to later figures. Media terminal 142, access terminal 112, and switching device 132 may be at the same user premises (e.g., within a single consumer's home), or may be distributed in different locations.

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a multi-function fiber gateway, a multi-protocol fiber interconnect device, a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the switching device 132 can include a multi-function fiber gateway, a multi-protocol fiber interconnect device, a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a multi-function fiber gateway, a multi-protocol fiber interconnect device, a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media. For example, content sources 175 may host a website or an application accessible by a user of one of media terminal 142, access terminal 112, or switching device 132. As further described below, a website or app that is accessible by a user may allow the user to configure functions of one or more multi-function fiber gateways and/or multi-protocol fiber interconnect devices.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In various embodiments, the RAN node (e.g., base station, eNodeB, gNodeB) 122 can include a 4G, 5G, or higher generation RAN node. The user equipments (UEs) 124 and 126 can include vehicles, mobile phones, e-readers, tablets, phablets, wireless modems, and/or other (mobile or immobile) computing devices.

Figure 2A:
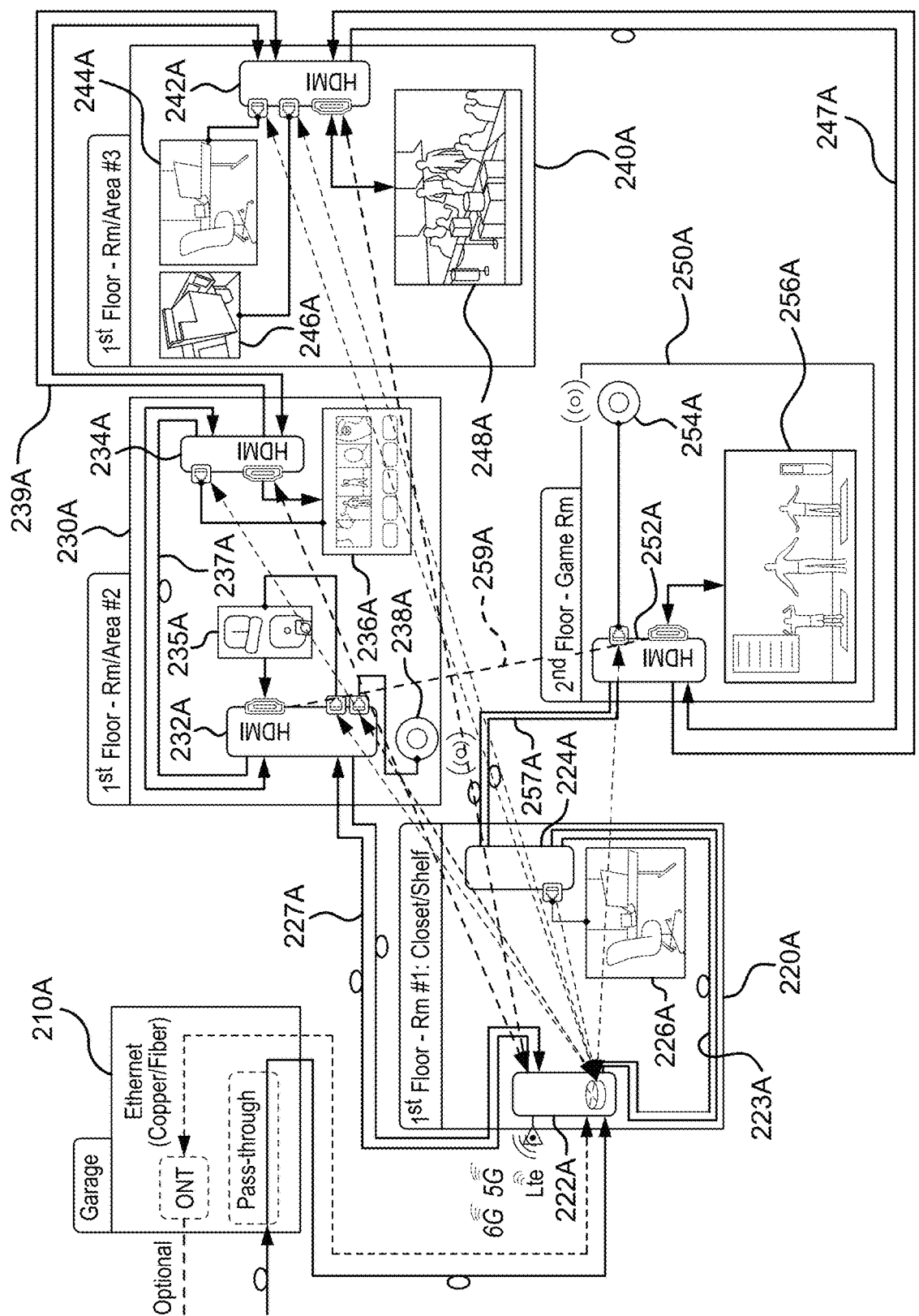
FIG. 2A is a block diagram illustrating an example, non-limiting embodiment of a fiber interconnect system including a multi-function fiber gateway and multiple multi-protocol fiber interconnect devices in accordance with various aspects described herein.

FIG. 2A is a block diagram illustrating an example, non-limiting embodiment of a fiber interconnect system including a multi-function fiber gateway and multiple multi-protocol fiber interconnect devices in accordance with various aspects described herein.

The fiber interconnect system shown in FIG. 2A is an example of a fiber interconnect system at a user premises. For example, a connection to an Internet service provider (ISP) may be provided in a garage 210A as a fiber connection, a copper electrical connection, or any other type of Internet connection, and that Internet connection is provided to the first room shown at 220A. In the example of FIG. 2A, the user premises includes the garage 210A and the first room 220A as well as a second room 230A, a third room 240A, and a fourth room 250A. Each of the rooms shown at the user premises can be an actual room, or just an area that houses the functionality shown within each room in the figure.

Room 220A is shown having a multi-function fiber gateway 222A, also referred to herein as a "universal home gateway," and a multi-protocol fiber interconnect device 224A also referred to herein as a "wall box." Room 220A also includes a computer 226A coupled to wall box 224A via an Ethernet connection.

Room 230A includes wall boxes 232A and 234A, as well as video devices 235A and 236A. Room 230A also includes a Wi-Fi access point 238A. Video device 235A is shown coupled to wall box 232A by both an Ethernet connection and an HDMI connection. In some embodiments, video device 235A may be a video streaming device, such as any currently available device that receives broadband data either wirelessly or via a wired connection (e.g., an Ethernet connection), and (typically through a streaming service) produces video data on an HDMI cable. In the example of FIG. 2A, video device 235A communicates with the Internet using the Ethernet port shown on wall box 232A and provides HDMI video to other device(s) on the user premises using the HDMI port on wall box 232A. Similarly, video device 236A is coupled to both an Ethernet port and an HDMI port on wall box 234A. Video device 236A and all other video devices referenced herein may consume video, source video, or both. The way in which wall boxes support these different configurations is described further below.

Room 240A includes wall box 242A, computer 244A, printer 246A and video device 248A. Room 250A includes wall box 252A, video device 256A, and wireless access point 254A.

In some embodiments, universal home gateway 222A serves the function of access terminal 112, media terminal 142, and/or switching device 132 (FIG. 1). For example, universal home gateway 222A may provide broadband access, media access, voice access, and any other type of access that can be provided by communications network 125.

In embodiments represented by FIG. 2A, the universal home gateway and wall boxes are connected via optical fiber. For example, universal home gateway 222A, and wall boxes 224A, 232A, 234A, 242A, and 252A are daisy chained using fibers 223A, 227A, 237A, 239A, 247A, and 257A. In other embodiments, the daisy chaining of fiber is an open-ended loop as opposed to a closed loop as shown in FIG. 2A. For example, in some embodiments, one or more of the fiber interconnections between wall boxes, or a wall box and the universal home gateway may be omitted.

Universal home gateway 222A may have both optical fiber connections and other types of connections. For example, universal home gateway 222A has a wide area network (WAN) side, or "port," (shown on the left side of gateway 222A) that communicates with the WAN (e.g., ISP connection or Internet), and also has an optical side or port (shown on the right side of gateway 222A) that communicates with wall boxes via optical fiber(s). The WAN port of gateway 222A may include a fiber connection, a copper electrical connection, a wireless connection, or any other type of connection capable of reaching an ISP and/or the Internet. The optical side of the gateway 222A includes optical terminal(s) capable of communicating with optical terminal(s) in the various wall boxes on the user premises. As described further below, gateway 222A may include pluggable hardware modules, and may also include computing resources capable of instantiating virtual machines or containers to provide additional functionality.

In some embodiments, the various wall boxes shown in FIG. 2A also have both optical fiber connections and other types of connections. For example, wall box 224A has optical terminals shown on the right and an Ethernet connection shown on the left, wall box 232A has optical terminals shown on the left, and HDMI and Ethernet connections shown on the right, wall box 234A has optical terminals shown on the right, and HDMI and Ethernet connections shown on the left, wall box 242A has optical terminals shown on the right and HDMI and Ethernet connections shown on the left, and wall box 252A has optical terminals shown on the left, and HDMI and Ethernet connections shown on the right. The optical side of the wall boxes includes optical terminal(s) capable of communicating with optical terminal(s) in other wall boxes and optical terminal(s) in the universal home gateway. As described further below, the wall boxes may include pluggable hardware modules to implement the various interfaces, both optical and non-optical.

In some embodiments, the optical fibers shown in FIG. 2A carry multiple different types of data traffic. For example, logical Ethernet bitstreams, logical video bitstreams, and other types of data streams may be packetized and multiplexed onto the various fibers that connect the universal home gateway and the wall boxes. The various bitstreams may be time multiplexed, wavelength multiplexed, or multiplexed in any other manner that allows multiple different data streams to be carried on the optical fiber. As used herein, the term "logical Ethernet bitstreams" refers to a data stream that may have originated at an Ethernet compliant interface, and that may be destined for an Ethernet compliant interface, yet is currently in another form. For example, a logical Ethernet bitstream may be an addressable packetized grouping of data bits that represent the contents of an Ethernet compliant signal. Similarly, other logical bitstreams may be addressable packetized groupings of data bits that represent signals in another format. For example, as used herein, the term "logical video bitstreams" refers to a data stream that may have originated at a video interface (e.g., an HDMI signal), and that may be destined for another video interface (e.g., a destination HDMI device), yet is currently in another form. For example, a logical video bitstream may be a packetized grouping of data bits that represent the contents of an HDMI signal. Some embodiments include many different types of logical data streams, such as logical infrared (IR) remote control bitstreams, logical home automation bitstreams, and the like.

By multiplexing different types of data traffic, the optical fibers may provide logical interconnections between devices physically connected to different wall boxes and/or the universal home gateway. For example, the dotted lines shown in FIG. 2A between wall boxes and the dotted lines shown in FIG. 2A between the universal home gateway and wall boxes represent logical connections (e.g., logical Ethernet connections, logical video connections, etc.) between devices at the user premises. In one specific example, a logical connection between a virtual router in universal home gateway 222A and an Ethernet port on wall box 232A is shown at 229A, and a logical connection between an HDMI port on wall box 232A and an HDMI port on wall box 252A is shown at 259A.

In operation of this specific example, gateway 222A addresses a logical Ethernet bitstream to the Ethernet port on wall box 232A and multiplexes the logical Ethernet bitstream onto the optical fiber 227A, 223A, or both. Wall box 232A identifies the multiplexed optical signal addressed to one of its Ethernet ports and provides the logical Ethernet bitstream to the Ethernet port connected to media device 235A. Similarly, wall box 232A addresses a logical video bitstream (e.g., an HDMI bitstream received from media device 235A) to the HDMI port on wall box 252A, and multiplexes the logical video bitstream on the optical fiber 227A, 230A, or both. Wall box 252A identifies the multiplexed signal addressed to its HDMI port and provides the logical video bitstream to the HDMI port connected to media device 256A. In this example, media device 235A may be a video streaming device that receives data from the Internet over an Ethernet connection and provides streaming video to a device in another room over an HDMI connection. Further, in this example, media device 256A may be a television that receives the streaming video provided by media device 235A.

In the various embodiments represented in FIG. 2A, a logical bitstream of any type may be sourced from any first device, addressed to any second device, and multiplexed onto optical fiber at the user premises. Gateways and wall boxes may be a source of data (e.g., wall box 232A may source video data from media device 235A, gateway 222A may source many different types of data from the Internet, etc.) and may address that data to devices connected to other gateways and/or wall boxes. Each gateway and wall box monitors multiplexed data traffic on the optical fiber for data traffic addressed to itself and forwards that data to connection(s) associated with the address. When a gateway or wall box detects optical data traffic not addressed to that gateway or wall box, the traffic is allowed to pass through so that other devices connected to the optical fiber may retrieve the traffic as appropriate.

Although FIG. 2A primarily shows video and Ethernet traffic, any type of data traffic may be carried. For example, in some embodiments, data traffic representing infrared (IR) remote control signals may be multiplexed on the optical fiber. In this example, a user in room 250A may wish to control media device 235A (which is in a different room and outside the range of an IR remote) when consuming video supplied by 235A on television 256A. Wall box 252A may have a pluggable module to receive IR signals from a remote, and may packetized the IR signals, address them to an IR emitter pluggable module in wall box 232A, and multiplex the resulting logical IR remote control signals on the optical fiber. Wall box 232A receives the logical IR remote control signals on the optical fiber and provides them to the IR emitter which then emits IR remote control signals to control media device 235A. In this manner, any device may source data, any device may consume data, and any device may control other devices, all without the necessity of point-to-dedicated wiring.

In some embodiments, some or all of the functionality described with reference to FIG. 2A is provided as a service. For example, a service provider, such as an ISP, may sell a service to a user that allows a user to specify which connections on which wall boxes and gateways are to be associated with each other. Also for example, the service provider may license the use of the wall boxes, gateways, and/or the pluggable modules within the wall boxes and gateways.

Figure 2B:
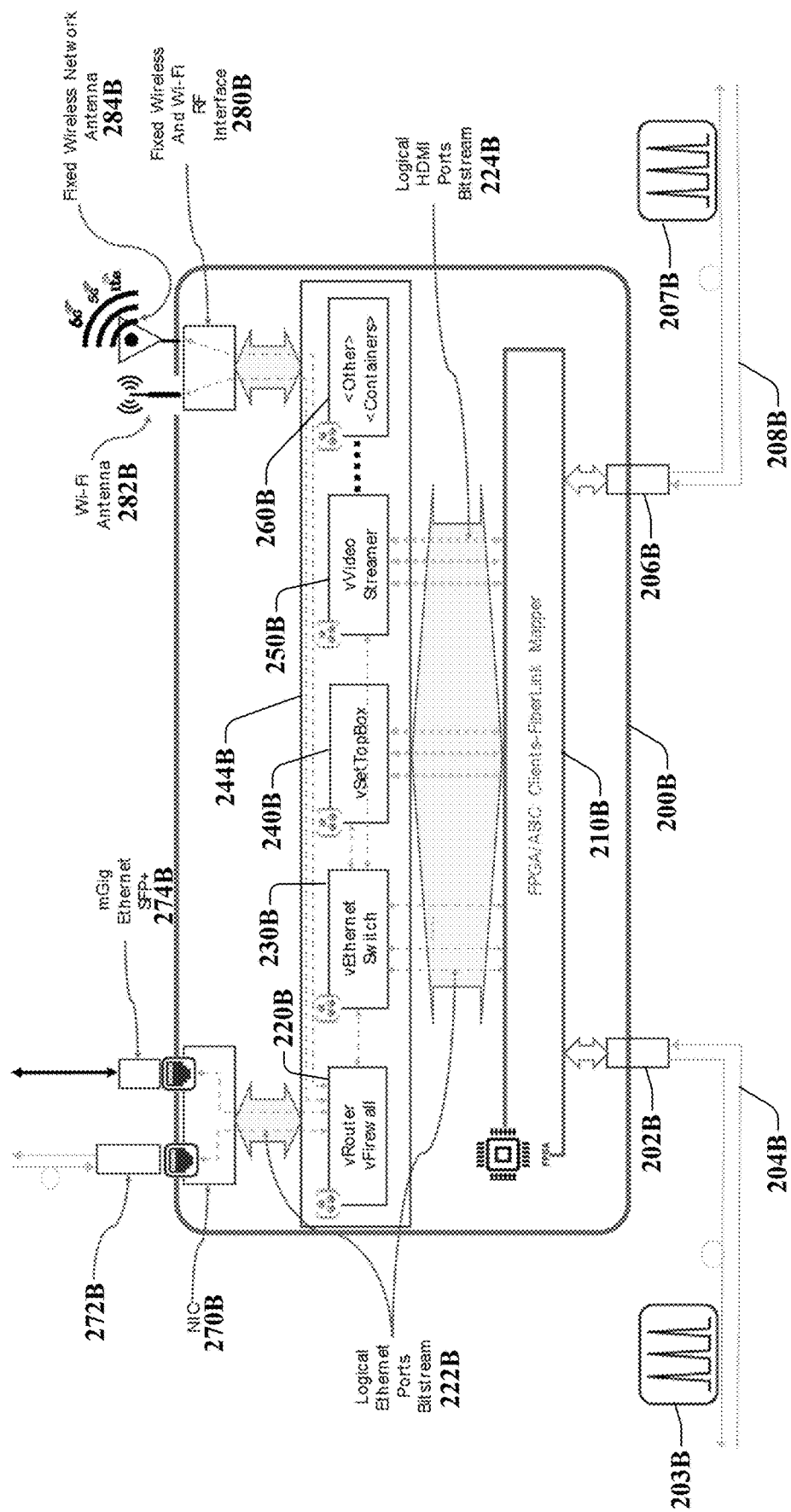
FIG. 2B is a block diagram illustrating an example, non-limiting embodiment of a multi-function fiber gateway in accordance with various aspects described herein.

FIG. 2B is a block diagram illustrating an example, non-limiting embodiment of a multi-function fiber gateway in accordance with various aspects described herein. Multi-function fiber gateway 200B is an example of a universal home gateway such as universal home gateway 222A (FIG. 2A). Multi-function fiber gateway 200B is shown with WAN ports 272B, 274B, and 284B. WAN port 272B is an optical port, WAN port 274B is a copper port, and WAN port 284B is a wireless port. Port 282B is a WiFi port, and WAN port 284B is a fixed wireless port, such as a cellular radio antenna that can connect to a 4G, 5G, or later radio access network (e.g., an eNodeB or gNodeB) or a satellite antenna that can connect to low earth orbit (LEO) or geosynchronous satellites. In some embodiments, one or more of ports 272B, 274B, 282B, and 284B include pluggable modules. For example, small form-factor pluggable (SFP) transceivers or USB dongles may be employed for Ethernet connections, optical connections, or wireless connections. In some embodiments, one or more of WAN ports 272B, 274B, and 284B provide connectivity to an ISP and/or the Internet. In some embodiments, multi-function fiber gateway 200B includes less than all of ports 272B, 274B, 282B, and 284B. For example, multi-function fiber gateway 200B may include only optical WAN port 272B, or fixed wireless WAN port 284B. WAN ports 272B and 274B are shown coupled to a network interface card (NIC) 270B, and WAN ports 282B and 284B are shown coupled to a fixed wireless and WiFi interface 280B.

Multi-function fiber gateway 200B is also shown having a multi-function fiber interface that includes optical fiber connections 202B and 206B coupled to optical fibers 204B and 208B, respectively. In the example embodiments of FIG. 2B, fiber connections 202B and 206B correspond to the fiber connections shown on the right side of gateway 222A (FIG. 2A). In some embodiments, fiber connections 202B and 206B include pluggable modules. For example, dense wavelength division multiplexing (DWDM) SFP modules may be used for connections 202B and 206B. Any type of optical interface may be employed, as DWDM SFP modules are merely provided as examples of suitable optical interface devices. Different wavelengths are shown at 203B and 207B to represent wavelength division multiplexed logical data stream on fibers 204B and 208B, respectively.

Multi-function fiber gateway 200B also includes compute resources 244B. Compute resources 244B may be any type of compute resources capable of executing instructions to perform tasks. For example, compute resources 244B may be a generic computer, a microcontroller, a server, or any other type of system having a processor capable of executing instructions. In some embodiments, compute resources 244B may include a non-transitory computer readable medium that stores instructions to be executed by a processor. For example, compute resources 244B may include memory organized as random access memory (RAM), read only memory (ROM), a solid state disk (SSD), or any other storage medium capable of storing digital bits of information. Further examples of devices with compute resources are described below with reference to later figures.

In operation, compute resources 244B may implement functional units to support the operation of multi-function fiber gateway 200B. For example, compute resources may instantiate one or more virtual machines or container objects. In the example of FIG. 2B, gateway 200B has instantiated a virtual router/firewall 220B, a virtual Ethernet switch 230B, a virtual set top box 240B, a virtual video streaming device 250B, and others 260B. Virtual router/firewall 220B may communicate with one or more of WAN ports 272B, 274B, and 284B to receive and transmit logical Ethernet bitstreams 222B to and from an ISP or the Internet. Virtual router/firewall 220B may also communicate with one or more of the other virtual machines. For example, virtual Ethernet switch 230B may receive one or more logical Ethernet bitstreams 222B from virtual router/firewall 220B and route the logical Ethernet bitstreams accordingly. In some embodiments, one or more logical Ethernet bitstreams 222B may be provided to other virtual machines instantiated on compute resources 244B, such as virtual set top box 240B or virtual video streaming device 250B. Also in some embodiments, one or more logical Ethernet bitstreams 222B are addressed to devices connected to other gateways or wall boxes and are forwarded to the client fiberlink mapper device 210B.

In some embodiments, fiberlink mapper device 210B packetizes logical data streams received from compute resources 244B (e.g., one or more of the virtual machines), and addresses the packetized logical data streams to another device reachable via one of fibers 204B and 208B (e.g., a wall box or a device connected to a wall box). For example, fiberlink mapper device 210B may receive a logical Ethernet bitstream from virtual Ethernet switch 230B destined for an Ethernet port on wall box 242A (FIG. 2A) and may also receive a logical HDMI bitstream 224B from virtual streaming device 250B destined for television 256A connected to an HDMI port on wall box 252A (FIG. 2A). Fiberlink mapper device 210B may then packetize the logical data streams, address the packets to the appropriate devices, and provide the packets to fiber connections 202B and/or 206B to be multiplexed on one or more of optical fibers 204B and 208B.

Fiberlink mapper 210B may be implemented in any suitable manner. For example, in some embodiments, fiberlink mapper 210B may be implemented in a field programmable gate array (FPGA), an application specific integrated circuit (ASIC), or using a combination of an FPGA and/or ASIC and a microcontroller. In some embodiments, fiberlink mapper 210B may be embodied on a pluggable module that is removable from gateway 200B.

In some embodiments, gateway 200B may multiplex any number of different types of data streams onto optical fibers. For example, multiple logical Ethernet bit streams, multiple logical video bitstreams, and multiple other types of data streams may be packetized, addressed, and multiplexed onto optical fibers.

In some embodiments, gateway 200B is implemented using what is sometimes referred to as a "white box." A generic compute platform may implement compute resources 244B, and the various hardware related functionality may be provided by pluggable modules, such as NIC cards, wireless cards, SFP transceivers, and the like. In some embodiments, cards may adhere to an industry standard such as PCIe.

In some embodiments, some or all of the functionality described with reference to FIG. 2B is provided as a service. For example, a service provider, such as an ISP, may sell a service to a user that allows a user to instantiate a particular virtual machine or to utilize a particular hardware module such as a NIC or a wireless interface.

Figure 2C:
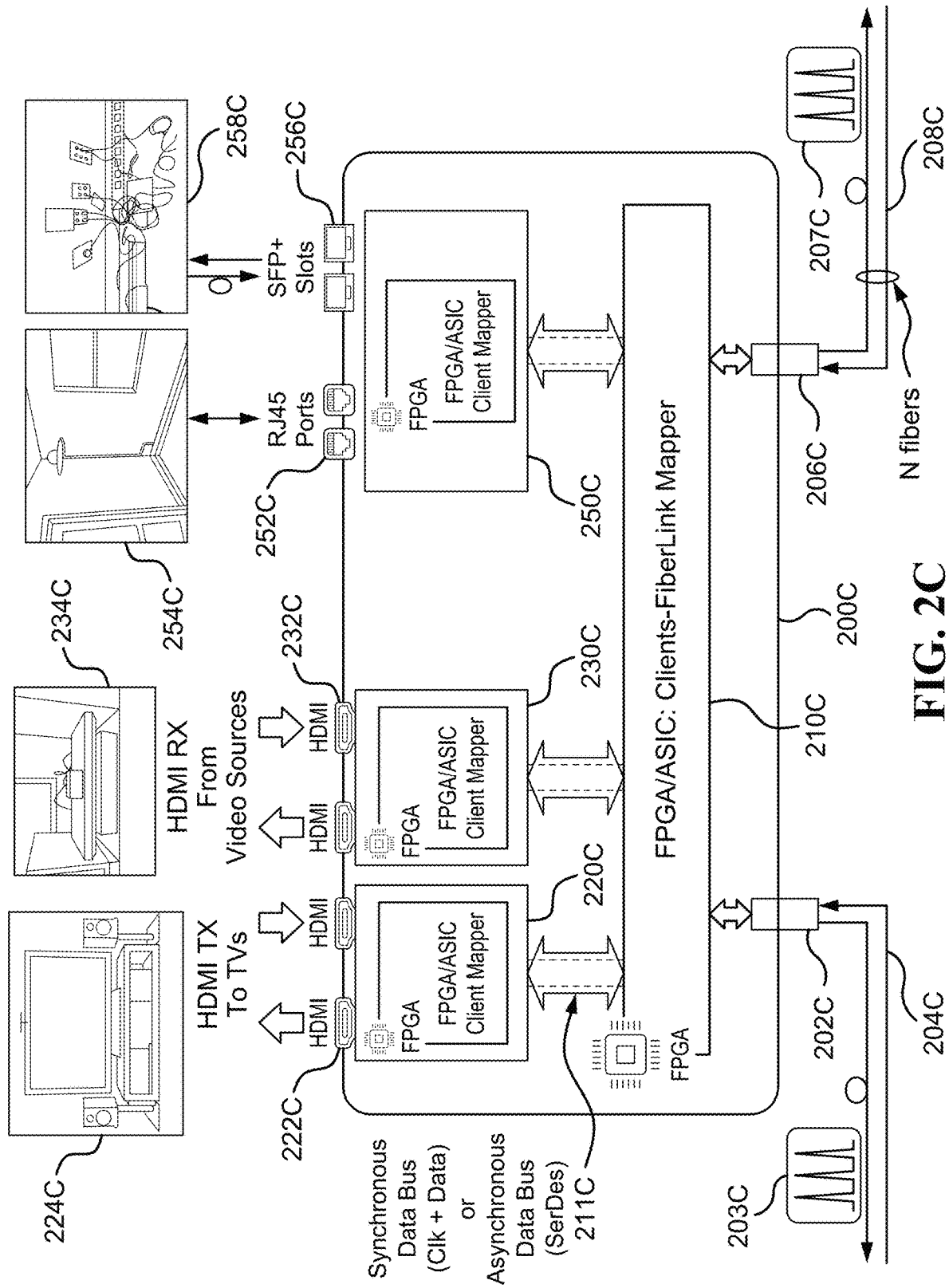
FIG. 2C is a block diagram illustrating an example, non-limiting embodiment of a multi-protocol fiber interconnect device in accordance with various aspects described herein.

FIG. 2C is a block diagram illustrating an example, non-limiting embodiment of a multi-protocol fiber interconnect device in accordance with various aspects described herein. Multi-protocol fiber interconnect device 200C is an example of a wall box such as any of the wall boxes shown in FIG. 2A. Multi-protocol fiber interconnect device 200C is shown with client side ports 222C, 232C, 252C, and 256C. Client side ports 222C, 232C, 252C, and 256C are ports that are intended to be coupled to user devices on the user premises. For example, ports 222C are shown as HDMI ports coupled to a media device 224C, ports 232C are shown as HDMI ports coupled to media device 234C, ports 252C are shown as RJ45 ports coupled to WiFi access point 254C, and ports 256C are shown as optical fiber transceivers plugged into SFP slots and coupled to router 258C. In the example embodiments of FIG. 2C, client side ports 222C, 232C, 252C, and 256C correspond to the client side connections shown on the left side of wall box 242A (FIG. 2A), or any of the other wall box client side connections shown in FIG. 2A.

Multi-protocol fiber interconnect device 200C is also shown having optical fiber connections 202C and 206C coupled to optical fibers 204C and 208C, respectively. In the example embodiments of FIG. 2C, fiber connections 202C and 206C correspond to the fiber connections shown on the right side of wall box 242A (FIG. 2A), or any of the other optical fiber connections shown on the various wall boxes in FIG. 2A. In some embodiments, fiber connections 202C and 206C include pluggable modules. For example, dense wavelength division multiplexing (DWDM) SFP modules may be used for connections 202C and 206C. Any type of optical interface may be employed, as DWDM SFP modules are merely provided as examples of suitable optical interface devices. Different wavelengths are shown at 203C and 207C to represent wavelength division multiplexed logical data stream on fibers 204C and 208C, respectively.

Multi-protocol fiber interconnect device 200C also includes client fiberlink mapper device 210C and pluggable modules 220C, 230C, and 250C. In some embodiments, client fiberlink mapper device 210C packetizes logical data streams received from the pluggable modules (e.g., one or more of pluggable modules 220C, 230C, and 250C), and addresses the packetized logical data streams to another device reachable via one of fibers 204C and 208C (e.g., a gateway, a wall box, or a device connected to a wall box). For example, client fiberlink mapper device 210C may receive a logical Ethernet bitstream from pluggable module 250C destined for an Ethernet port on a different wall box and may also receive a logical HDMI bitstream from pluggable module 230C destined for a television connected to an HDMI port on a different wall box. Client fiberlink mapper device 210C may then packetize the logical data streams, address the packets to the appropriate devices, and provide the packets to fiber connections 202C and/or 206C to be multiplexed on one or more of optical fibers 204C and 208C.

Client fiberlink mapper 210C may be implemented in any suitable manner. For example, in some embodiments, client fiberlink mapper 210C may be implemented in a field programmable gate array (FPGA), an application specific integrated circuit (ASIC), or using a combination of an FPGA and/or ASIC and a microcontroller. In some embodiments, client fiberlink mapper 210C may be embodied on a pluggable module that is removable from wall box 200C. In some embodiments, client fiberlink mapper device 210C is implemented using a common hardware and/or software design as fiberlink mapper device 210B (FIG. 2B). In other embodiments, the two fiberlink mappers are different.

In some embodiments, wall box 200C may multiplex any number of different types of data streams onto optical fibers. For example, multiple logical Ethernet bit streams, multiple logical video bitstreams, and multiple other types of data streams may be packetized, addressed, and multiplexed onto optical fibers.

Multi-function fiber gateway 200B also includes pluggable modules 220C, 230C, and 250C. Pluggable modules 220C, 230C, and 250C provide interfaces between the client side ports of each pluggable module and client fiber link mapper device 210C. For example, pluggable modules 220C and 230C include video ports on the client side and communicate with client fiber link mapper device 210C using a data bus shown at 211C. Wall box 200C may include any number or type of pluggable module That may in turn include any type of client side port. For example, wall box 200C may include an infrared transmitter and/or receiver for interacting with an infrared remote device and or an infrared capable media device.

In operation, pluggable modules receive data streams in a native format on the client side ports and convert the native format data streams to logical bitstreams that may be packetized by client fiberlink mapper device 210C and multiplexed onto fibers 204C and 208C. For example, pluggable module 230C may receive HDMI video from media device 234C in a native HDMI format at the client side ports 232C and convert those native HDMI format signals to logical bitstreams and provide those logical bitstreams to client fiber link mapper device 210C. Similarly, pluggable modules may receive data streams in a logical bitstream from client fiber link mapper device 210C and convert those logical bitstreams into native formats to provide to client devices coupled to the client side ports. For example, pluggable module 220C may receive logical HDMI bitstreams from client fiber link mapper device 210C and convert those logical HDMI bitstreams into an HDMI signal in a native HDMI format and provide it to media device 224C coupled to client side ports 222C.

In some embodiments, some or all of the functionality described with reference to FIG. 2C is provided as a service. For example, a service provider, such as an ISP, may sell a service to a user that allows a user to operate a wall box for a particular purpose or to utilize a particular hardware module such as one of pluggable modules 220C, 230C, or 250C.

Figure 2D:
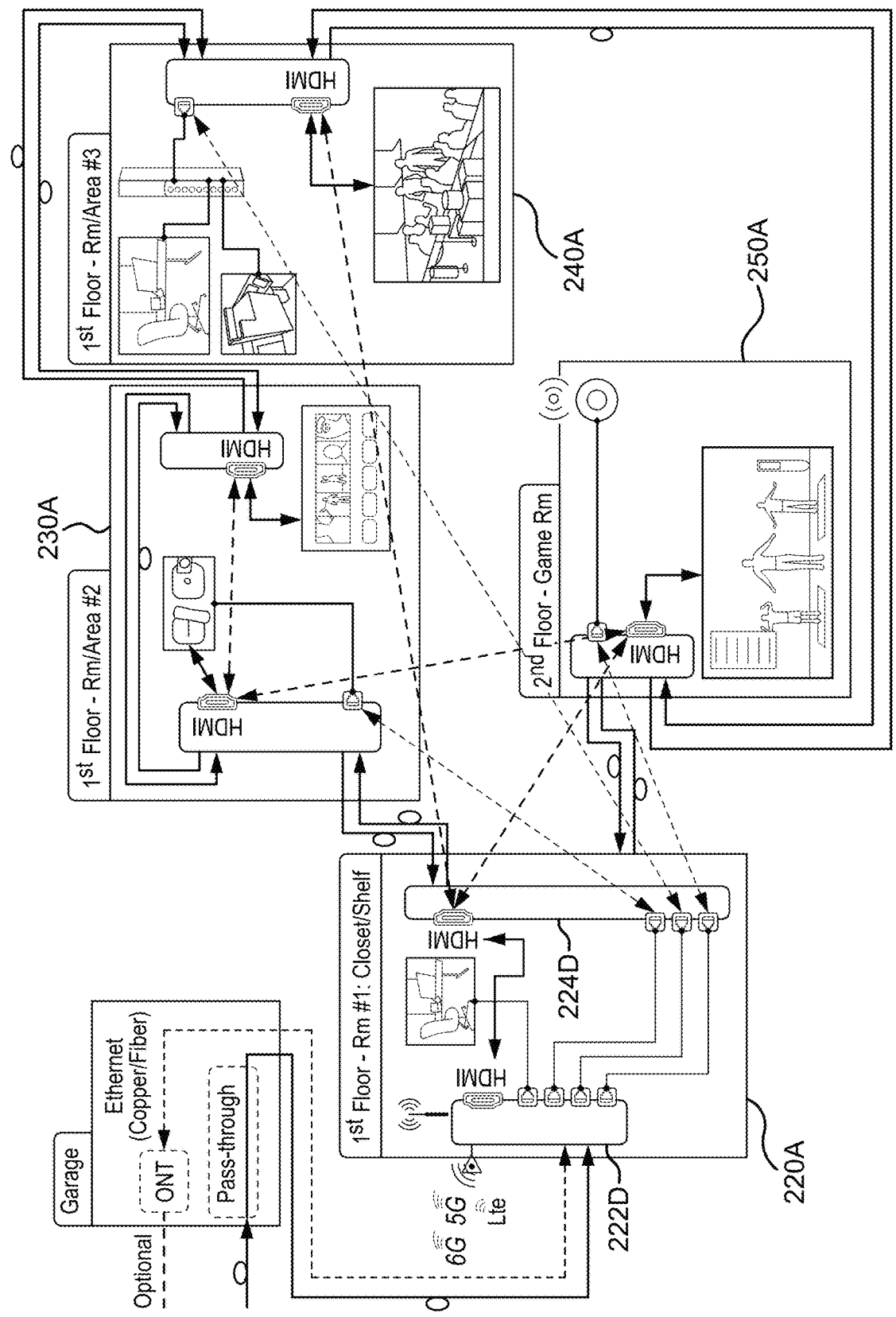
FIG. 2D is a block diagram illustrating an example, non-limiting embodiment of a fiber interconnect system including a multi-function gateway and multiple multi-protocol fiber interconnect devices in accordance with various aspects described herein.

FIG. 2D is a block diagram illustrating an example, non-limiting embodiment of a fiber interconnect system including a multi-function gateway and multiple multi-protocol fiber interconnect devices in accordance with various aspects described herein.

The fiber interconnect system shown in FIG. 2D is similar to the fiber interconnect system shown in FIG. 2A, with the exception that multi-function gateway 222D is not part of the daisy chained optical fiber loop in the same manner as multi-function fiber gateway 222A. Multi-function gateway 222D includes WAN side ports similar to multi-function fiber gateway 222A but includes local area network (LAN) side ports on its second side rather than optical connections. The LAN side ports may include any type of port. In the example of FIG. 2D, multi-function gateway 222D includes Ethernet ports and an HDMI ports.

Multi-function gateway 222D is coupled to a wall box 224D by the Ethernet and HDMI cables shown within room 220A, and wall box 224D then multiplexes logical bitstreams representing the Ethernet and HDMI signals onto optical fibers as discussed above with reference to previous figures.

Figure 2E:
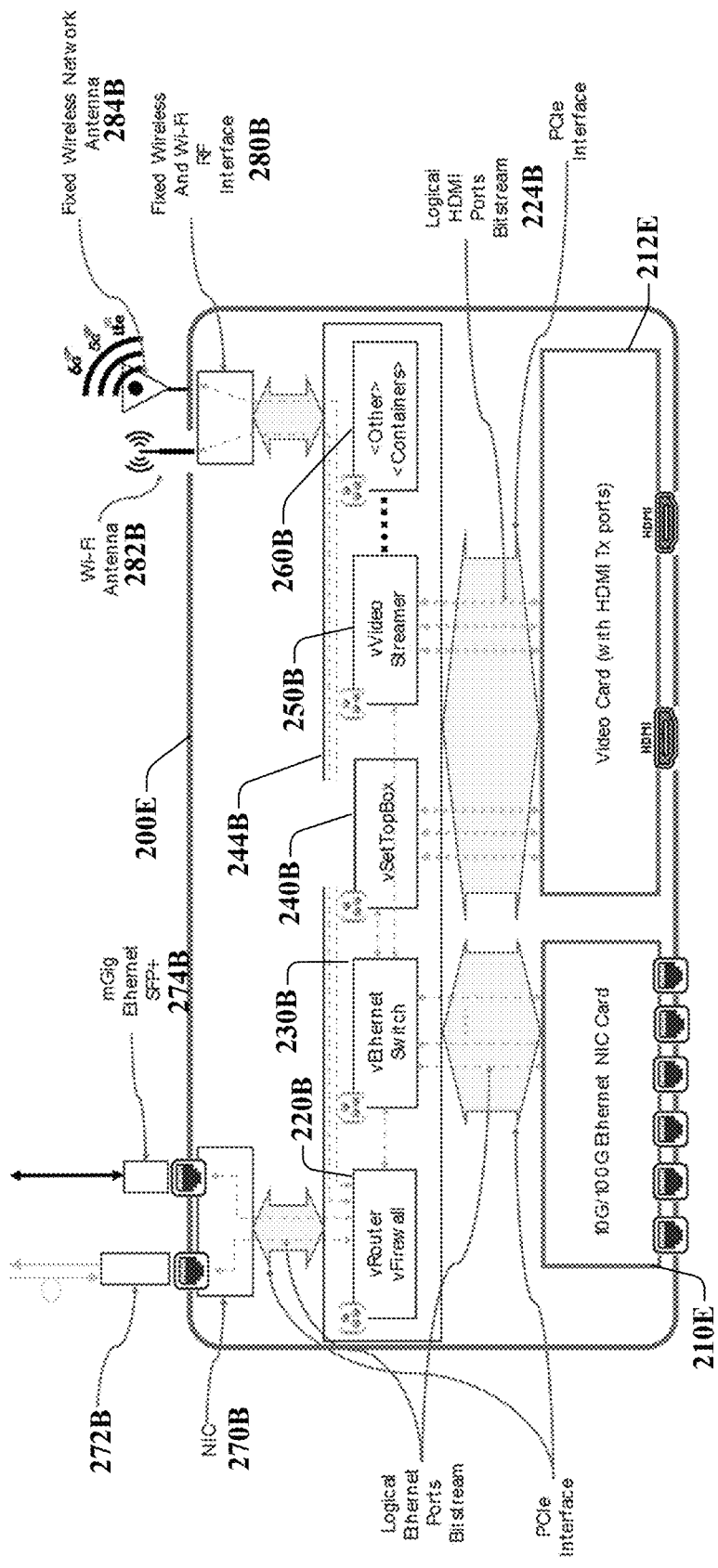
FIG. 2E is a block diagram illustrating an example, non-limiting embodiment of a multi-function gateway in accordance with various aspects described herein.

FIG. 2E is a block diagram illustrating an example, non-limiting embodiment of a multi-function gateway in accordance with various aspects described herein. Multi-function gateway 200E is an example of a multi-function gateway that may be used as multi-function gateway 222D (FIG. 2D). Multi-function gateway 200E is similar to multi-function fiber gateway 200B (FIG. 2B) with the exception that the fiberlink mapper device 210B of multi-function fiber gateway 200B is replaced with one or more pluggable modules. In the example of FIG. 2E, the fiberlink mapper device is replaced with an Ethernet NIC card 210E, and a video card with HDMI ports 212E.

Multi-function gateway 200E includes compute resources 244B and the ability to instantiate virtual machines in the same manner as multi-function fiber gateway 200B. The logical bitstreams produced by the virtual machines are converted to signals in their native format by the pluggable modules 210E and 212E. For example, Ethernet NIC card 210 may receive logical Ethernet bitstreams from virtual Ethernet switch 230B, convert them to Ethernet signals in a native Ethernet format, and provide them to a wall box or client device connected to one of the Ethernet ports. Similarly, video card 212E may receive logical HDMI bitstreams from virtual set top box 240B and virtual streaming device 250B, convert them to HDMI signals in a native HDMI format, and provide them to a wall box or client device connected to one of the HDMI ports.

Figure 2F:
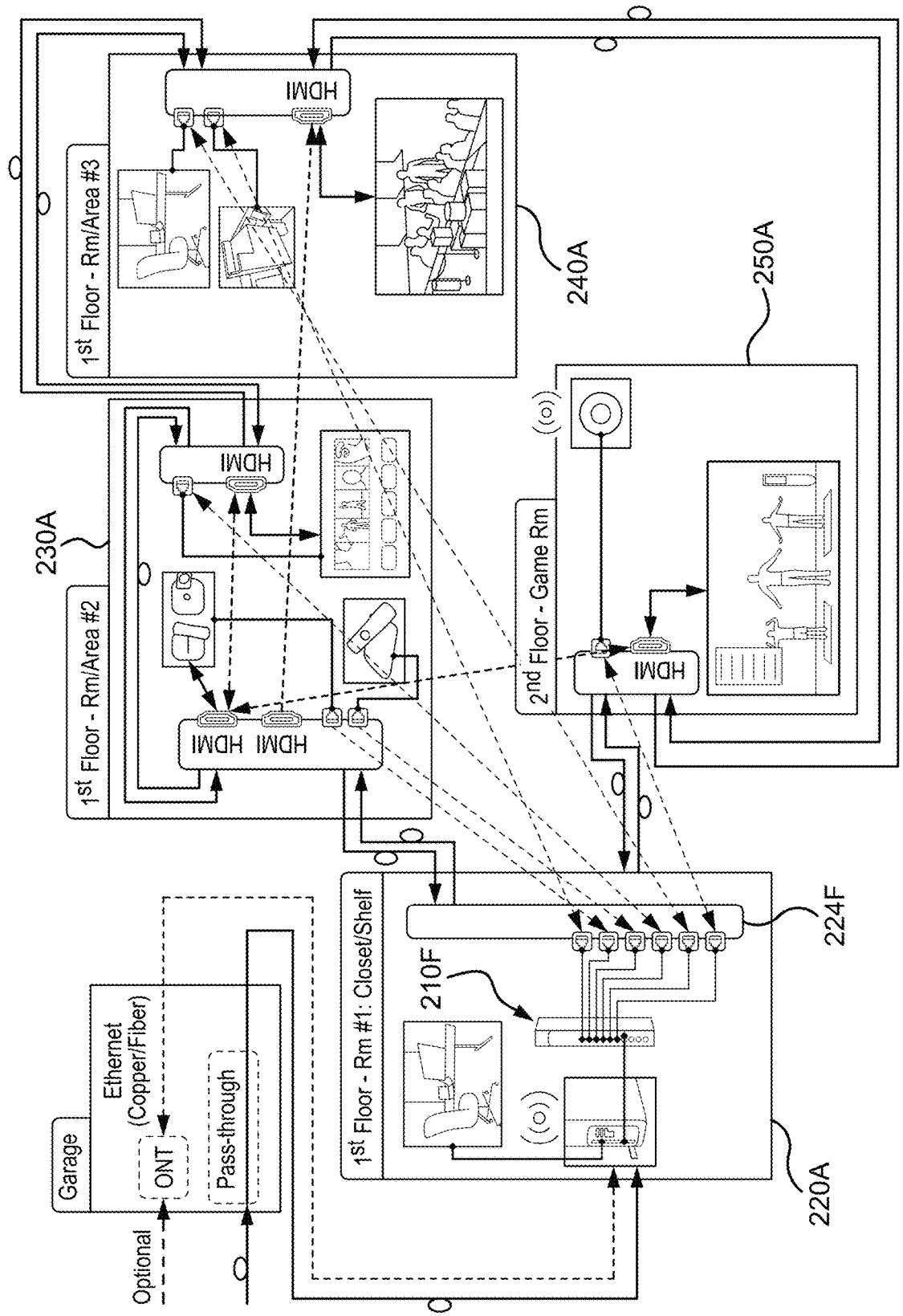
FIG. 2F is a block diagram illustrating an example, non-limiting embodiment of a fiber interconnect system including multiple multi-protocol fiber interconnect devices in accordance with various aspects described herein.

FIG. 2F is a block diagram illustrating an example, non-limiting embodiment of a fiber interconnect system including multiple multi-protocol fiber interconnect devices in accordance with various aspects described herein.

The fiber interconnect system shown in FIG. 2F is similar to the fiber interconnect system shown in FIG. 2D, with the exception that multi-function gateway 222D is replaced with a router 210F that lacks the virtual machine functionality. In embodiments represented by FIG. 2F, router or Ethernet switch 210F provides Ethernet connections to the client side Ethernet ports on multi-protocol fiber interconnect device (wall box) 224F, which then multiplexes logical bitstreams representing the Ethernet signals onto optical fibers as discussed above with reference to previous figures.

Figure 2G:
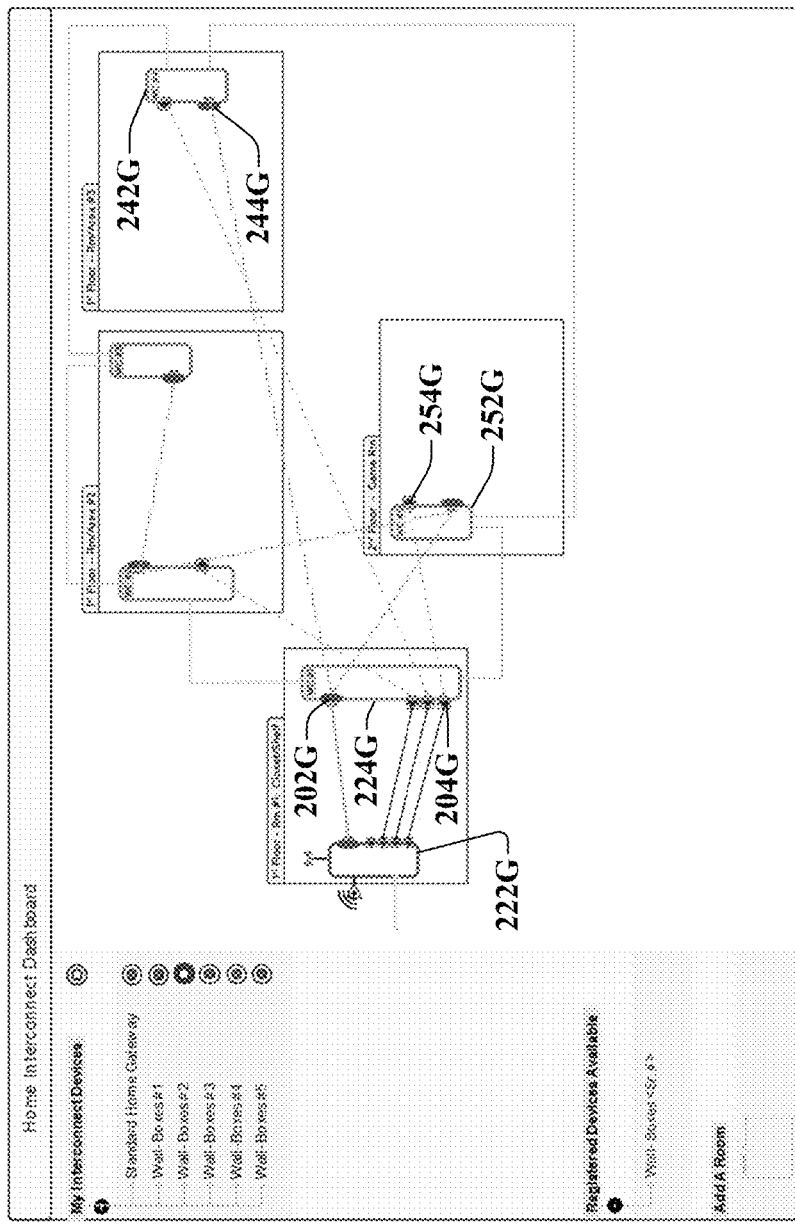
FIG. 2G is a block diagram illustrating an example, non-limiting embodiment of a configuration tool in accordance with various aspects described herein.

FIG. 2G is a block diagram illustrating an example, non-limiting embodiment of a configuration tool in accordance with various aspects described herein. Configuration tool 200G may be an application on a smartphone, a website, a dedicated program on a local computer or server, and application in the cloud, or any other tool capable of performing the configuration tasks described herein.

In some embodiments, configuration tool 200G allows a user to specify the configuration(s) of the fiber system in the user premise, including the layout of the user premises (e.g., number and name of rooms), number/type of gateway, the number/type of wall box, including the number and type of pluggable modules within gateways and wall boxes.

In addition, configuration tool 200G allows a user to specify the desired connectivity between pluggable modules in the gateways and wall boxes. For example, a user may specify that HDMI signals received by wall box 224G at HDMI port 202G are to be addressed to the HDMI port 244G at wall box 242G. In response to this configuration information, configuration tool 200G provides addressing information to wall boxes 224G and 242G that allows wall box 224G to address packetized logical HDMI bitstreams originating from HDMI port 202G to wall box 242G so that wall box 242G may receive the packetized logical HDMI bitstreams on the optical fiber, convert the logical HDMI bitstreams to an HDMI signal, and provide the HDMI signal on HDMI port 244G.

FIG. 2G shows a standard gateway that lacks the optical fiber interconnect and that is not included in the optical fiber daisy chain. In these embodiments, configuration tool 200G may also provide the ability for a user to specify what type of virtual machine is instantiated within the gateway. For example, the user may specify that a virtual streaming device is to be included within the gateway. In some embodiments, the user inputs into configuration tool 200G configuration information that reflects the existing configuration of the gateway. For example, gateway 222G may already have a virtual Ethernet switch and a virtual set top box instantiated, and the user may input information into configuration tool 200G to enable the existing configuration of gateway 222G. In other embodiments, the configuration tool 200G reacts to configuration information provided by the user by commanding gateway 222G to instantiate virtual machines.

In some embodiments, when a fiber interconnect system includes a universal home gateway, configuration tool 200G may provide the ability to specify virtual machines in the gateway as well as the ability to specify addressing for the logical bitstreams provided by (or received by) the various virtual machines. For example, referring back to FIG. 2A, configuration tool 200G may provide the ability to specify a virtual streaming device to be instantiated in gateway 222A, and may also provide the ability to specify that the logical video bitstream generated by the virtual streaming device is to be addressed to the HDMI port on wall box 242A. In this example, as a result of the configuration provided by configuration tool 200G, gateway 222A may instantiate a virtual streaming device, and configure the fiberlink mapper device within gateway 222A to receive a logical video bitstream from the virtual streaming device, packetize the logical video bitstream, addresses the packetized logical video bitstream to the HDMI port on wall box 242A, and multiplex the addressed packetized logical video bitstream onto the daisy-chained optical fiber. Similarly, as a result of the configuration provided by configuration tool 200G, wall box 242A will receive the addressed packetize logical video bitstream on the optical fiber, convert the logical video bitstream to an HDMI signal, and provide the HDMI signal on HDMI port on wall box 242A.

In some embodiments, the configuration tool 200G sends and receives management traffic to and from the various gateways and wall boxes. For example, the configuration tool may send control packets telling a specific port to address packets to a port or ports on a different wall box or telling a first port to respond to packets sent from a second port. When client traffic (e.g., video packets addressed to a specific port on a wall box) are detected at a wall box, the wall box picks up the packets and provides them to the port to which the packets are addressed (e.g., an HDMI port which then outputs an HDMI signal with the video content).

In some embodiments, the configuration tool 200G is embodied as an application or webserver in the cloud. In these embodiments, configuration tool 200G may send control packets from the cloud server though a communications network such as communications network 125 (FIG. 1), to the fiber interconnect system at the user premises (e.g., to the WAN port side of the gateway 222A). In other embodiments, the configuration tool may be on the local network at the user premises. For example, the configuration tool may run on a local computer connected to a port on one of the wall boxes or may run in a virtual machine instantiated in the gateway.

Figure 2H:
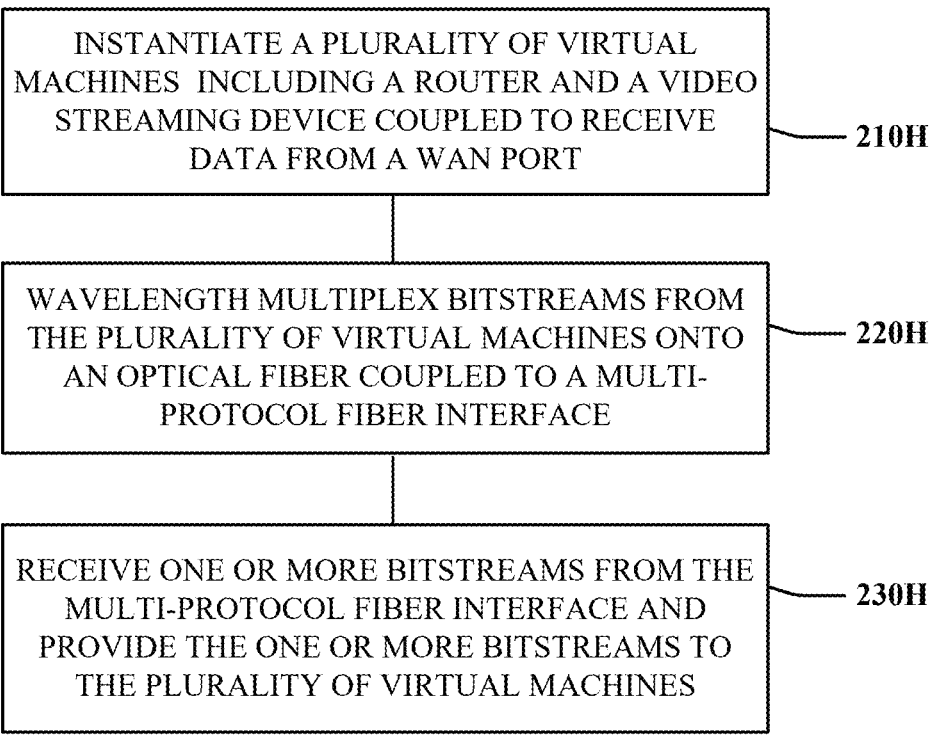
FIGS. 2H and 2I depict illustrative embodiments of methods in accordance with various aspects described herein.

FIG. 2H depicts illustrative embodiments of methods in accordance with various aspects described herein. At 210H of method 200H, a plurality of virtual machines including a router and a video streaming device coupled to receive data from a WAN port are instantiated. In some embodiments, this corresponds to instantiating one or more virtual machines in a multi-function fiber gateway, such as multi-function fiber gateway 200B (FIG. 2B) or instantiating one or more virtual machines in a multi-function gateway such as multi-function gateway 200E (FIG. 2E).

At 220H, bitstreams from the plurality of virtual machines are wavelength multiplexed onto an optical fiber coupled to a multi-protocol fiber interface. In some embodiments, the actions of 220H may be performed by the combination of a fiberlink mapper device and optical connectors, such as fiberlink mapper device 210B and optical connectors 202B and 206B.

At 230H, one or more bitstreams from the multi-protocol fiber interface are received and the one or more bitstreams are provided to the plurality of virtual machines. In some embodiments, this corresponds to a multi-function fiber gateway such as multi-function fiber gateway 200B (FIG. 2B) receiving a wavelength multiplexed optical signal on optical fibers coupled to the optical connections, determining which virtual machine within the gateway a particular logical bitstream is addressed to, and forwarding that logical bitstream to the appropriate virtual machine.

In operation of this specific example, gateway 222A addresses a logical Ethernet bitstream to the Ethernet port on wall box 232A and multiplexes the logical Ethernet bitstream onto the optical fiber 227A, 223A, or both. Wall box 232A identifies the multiplexed optical signal addressed to one of its Ethernet ports and provides the logical Ethernet bitstream to the Ethernet port connected to media device 235A. Similarly, wall box 232A addresses a logical video bitstream (e.g., an HDMI bitstream received from media device 235A) to the HDMI port on wall box 252A, and multiplexes the logical video bitstream on the optical fiber 227A, 230A, or both. Wall box 252A identifies the multiplexed signal addressed to its HDMI port and provides the logical video bitstream to the HDMI port connected to media device 256A. In this example, media device 235A may be a video streaming device that receives data from the Internet over an Ethernet connection and provides streaming video to a device in another room over an HDMI connection. Further, in this example, media device 256A may be a television that receives the streaming video provided by media device 235A.

Figure 2I:
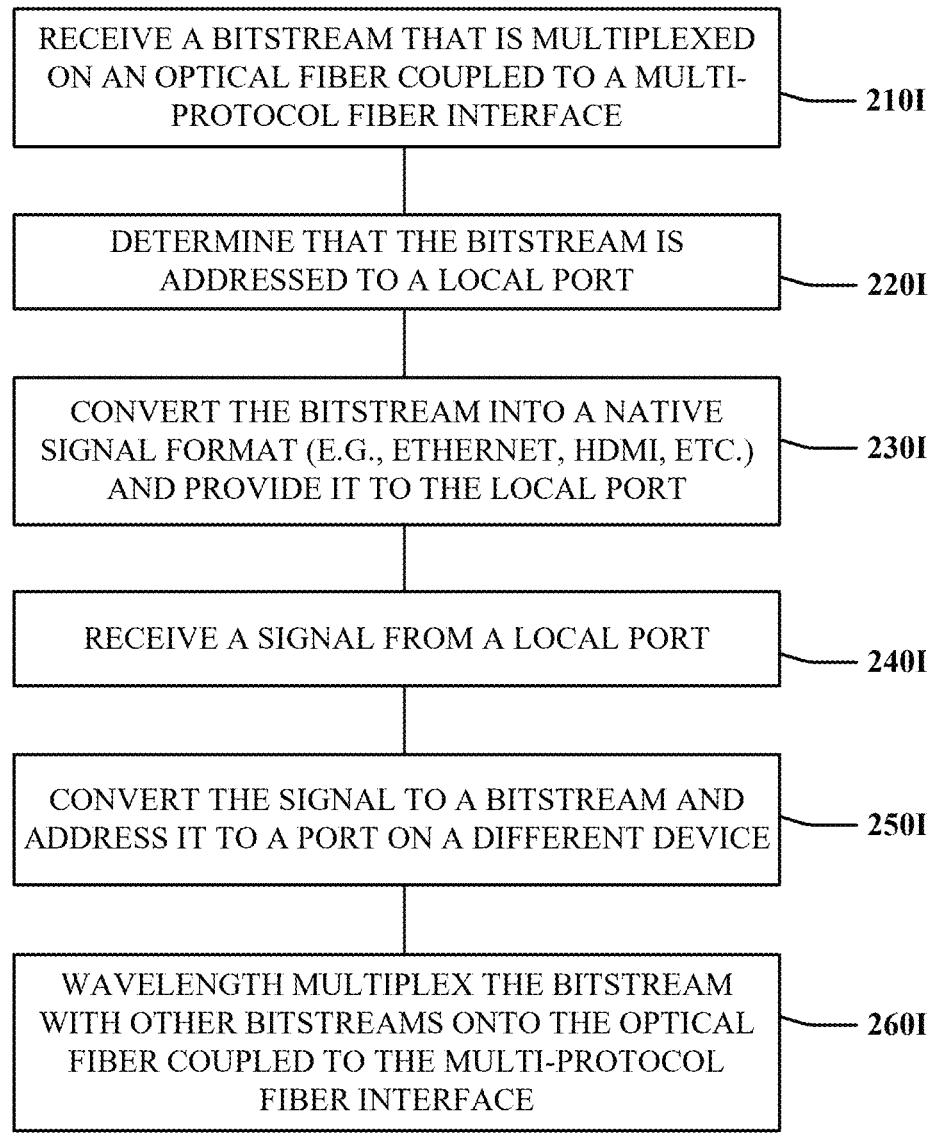

FIG. 2I depicts illustrative embodiments of methods in accordance with various aspects described herein. At 210I of method 200I, a bitstream that is multiplexed on an optical fiber coupled to a multi-protocol fiber interface is received. In some embodiments, this corresponds to a multi-protocol fiber interconnect device such as multi-protocol fiber interconnect device 200C (FIG. 2C) receiving a multiplexed bitstream at one of optical fibers 204C, 208C, or both. The multiplexed bit stream may originate from another device such as a multi-protocol fiber interconnect device or a multi-function fiber gateway.

At 220I, a determination is made that the bitstream is addressed to a local port. In some embodiments, this determination is made by inspecting packets received on the optical fibers and determining if the packets represent a logical bitstream addressed to a port on the multi-protocol fiber interconnect device. For example, referring again to FIG. 2C, fiber link mapper device 210C may determine that one or more bitstreams received on the optical fibers are addressed to one of the ports 222C, 232C, 252C, or 256C.

At 230I, the bitstream is converted into a native signal format (e.g., HDMI, Ethernet, etc.) and provided to the local port. In response to determining that a bitstream received on the optical fibers is addressed to one of the ports on the device, the multi-protocol fiber interconnect device may convert the bitstream into a native format expected by a device coupled to the port. For example, if a bit stream is addressed to an HDMI device such as device 224C or device 234C coupled to one of ports 222C or 232C, then fiberlink mapper 210C may convert the bitstream received on the optical fibers into a HDMI signal. Also for example, if fiberlink mapper 210C determines that a bit stream received on the optical fibers is addressed to an Ethernet port such as port 252C, fiber link mapper 210C may convert the bitstream received on the optical fiber into and Ethernet signal.

At 240I, a signal is received from a local port. In some embodiments, this corresponds to a multi-protocol fiber interconnect device receiving a signal from a device connected to a port. For example, multi-protocol fiber interconnect device 200C may receive HDMI signals at port 222C or port 232C. Also for example, multi-protocol fiber interconnect device 200C may receive an Ethernet signal at port 252C or an optical signal at port 256C.

At 250I, the signal is converted to a bitstream and addressed to a port on a different device. In some embodiments, this corresponds to fiber link mapper 210C converting one or more signals received at the ports described above into bitstreams, and at 260I the bit stream is wavelength multiplexed with other bit streams onto the optical fiber coupled to the multi-protocol fiber interface.

While for purposes of simplicity of explanation, the respective processes are shown and described as a series of blocks in FIGS. 2H and 2I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the systems, subsystems, and functions described herein. For example, virtualized communication network 300 can facilitate in whole or in part operations associated with a fiber interconnect system on a user premises.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include routers, domain name system (DNS) servers, and dynamic host configuration protocol (DHCP) servers, broadband network gateways, IP edge routers for IP-VPN, Ethernet and other services, load balancers, and other network elements. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
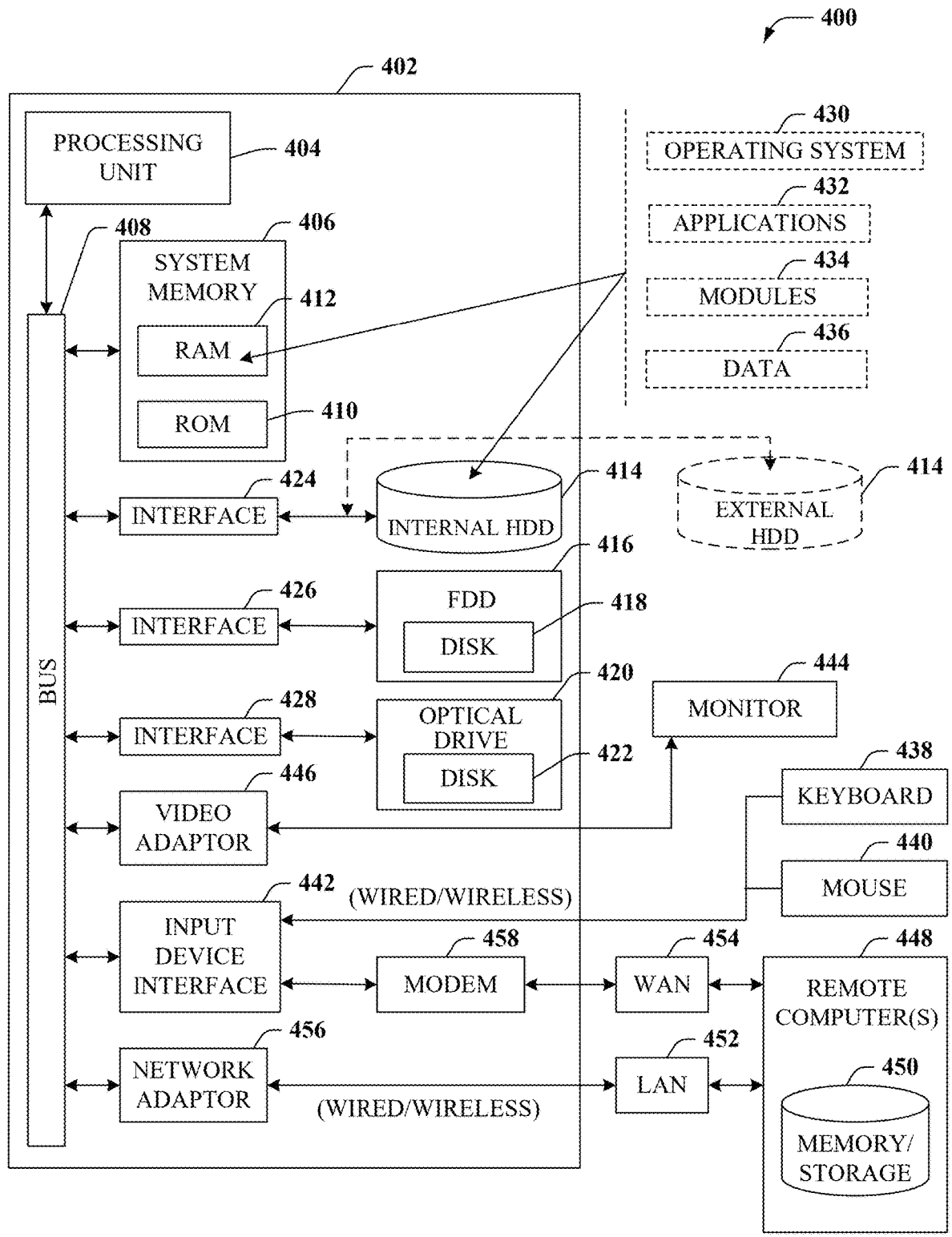
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part associated with a fiber interconnect system on a user premises.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
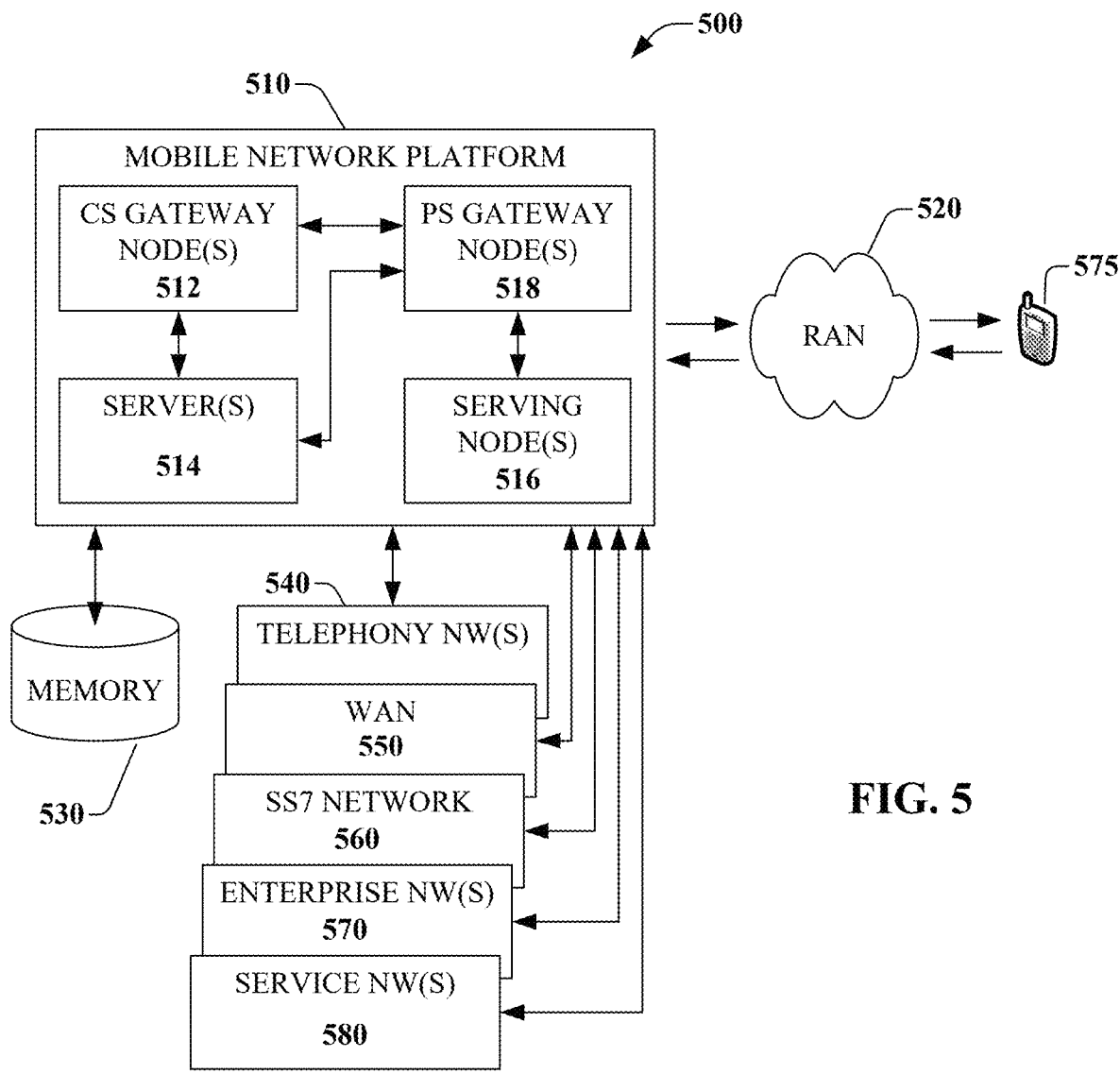
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part associated with a fiber interconnect system on a user premises. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
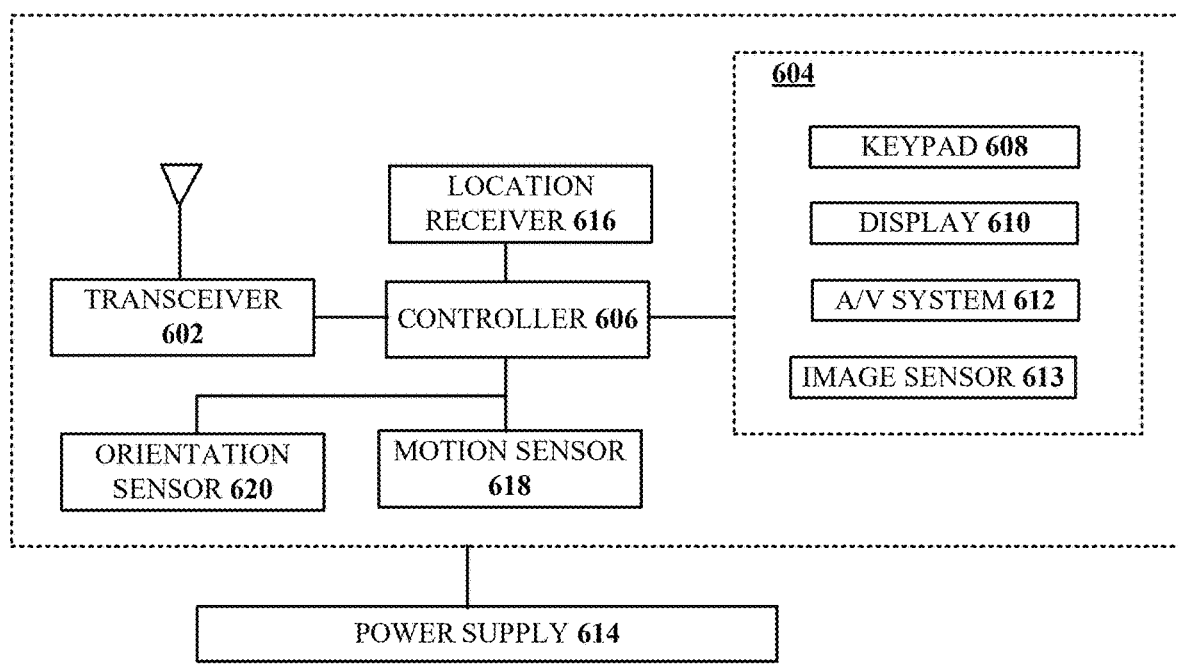
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part associated with a fiber interconnect system on a user premises.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue"

indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
    receiving first data from a wide area network (WAN) port of the device, the first data including a plurality of logical Ethernet bitstreams;
    instantiating a first virtual machine to receive a first logical Ethernet bitstream of the plurality of logical Ethernet bitstreams, and to produce a first logical video bitstream; and
    multiplexing a second logical Ethernet bitstream of the plurality of logical Ethernet bitstreams and the first logical video bitstream onto an optical fiber coupled to a multi-protocol fiber interface of the device.

2. The device of claim 1, wherein the multiplexing the second logical Ethernet bitstream and the first logical video bitstream onto the optical fiber comprises wavelength multiplexing.

3. The device of claim 1, wherein the receiving the first data from the WAN port comprises receiving the first data from an optical fiber WAN port or from a copper electrical WAN port.

4. The device of claim 1, wherein the receiving the first data from the WAN port comprises receiving the first data from a wireless WAN port.

5. The device of claim 1, wherein the operations further comprise instantiating a virtual router and a virtual switch to receive the first data, and to separate the first data into the plurality of logical Ethernet bitstreams.

6. The device of claim 1, wherein the first virtual machine comprises a virtual set top box.

7. The device of claim 1, wherein the first virtual machine comprises a logical video streaming service device.

8. The device of claim 1, wherein the operations further comprise addressing the first logical video bitstream to a destination device coupled to the optical fiber.

9. The device of claim 8 wherein the operations further comprise receiving, from the destination device, a virtual infrared controller signal to control the first virtual machine, wherein the virtual infrared controller signal is received as a wavelength multiplexed signal on the optical fiber.

10. A non-transitory machine-readable medium, comprising executable instructions that, when executed by a processing system including a processor, facilitate performance of operations, the operations comprising:
    instantiating a virtual router or switch to communicate with a wide area network (WAN) port;
    instantiating a first virtual machine, the first virtual machine comprising a virtual streaming device coupled to receive a first logical Ethernet bitstream from the virtual router or switch and to create a logical video bitstream; and
    multiplexing the logical video bitstream and a second logical Ethernet bitstream onto an optical fiber coupled to a multi-protocol fiber interface.

11. The non-transitory machine-readable medium of claim 10, wherein the operations further comprise addressing the logical video bitstream to a destination device coupled to the optical fiber.

12. The non-transitory machine-readable medium of claim 11 wherein the operations further comprise receiving, from the destination device, a virtual infrared controller signal to control the virtual streaming device, wherein the virtual infrared controller signal is received as a wavelength multiplexed signal on the optical fiber.

13. The non-transitory machine-readable medium of claim 10, wherein the multiplexing the logical video bitstream and the second logical Ethernet bitstream onto the optical fiber comprises wavelength multiplexing the logical video bitstream and the second logical Ethernet bitstream onto the optical fiber.

14. The non-transitory machine-readable medium of claim 10, wherein the operations further comprise:
    instantiating a second virtual machine, the second virtual machine comprising a virtual set top box coupled to receive a third logical Ethernet bitstream from the virtual router or switch and to create a second logical video bitstream; and
    multiplexing the second logical video bitstream onto the optical fiber coupled to the multi-protocol fiber interface.

15. A method, comprising:
    instantiating, by a processing system including a processor, a plurality of virtual machines coupled to receive data from a wide area network (WAN) port;

creating, by the plurality of virtual machines, a plurality of data streams in different formats from the data received from the WAN port; and wavelength multiplexing, by the processing system, the plurality of data streams in the different formats onto an optical fiber.

16. The method of claim 15, wherein the plurality of virtual machines comprises a video streaming service virtual machine.

17. The method of claim 15, wherein the plurality of virtual machines comprises a virtual router.

18. The method of claim 15, wherein the plurality of virtual machines comprises a virtual Ethernet switch.

19. The method of claim 15, wherein the plurality of virtual machines comprises a virtual set top box.

20. The method of claim 15, wherein the plurality of data streams of the different formats includes at least one logical HDMI data stream.

* * * * *